(12) United States Patent
Wang et al.

(10) Patent No.: US 11,680,851 B2
(45) Date of Patent: Jun. 20, 2023

(54) DEVICE FOR MEASURING SURFACE TEMPERATURE OF TURBINE BLADE BASED ON ROTATABLE PRISM

(71) Applicant: University of Electronic Science and Technology of China, Sichuan (CN)

(72) Inventors: Chao Wang, Sichuan (CN); Jing Jiang, Sichuan (CN); Anmei Qiu, Sichuan (CN); Yekui Zhong, Sichuan (CN); Yi Niu, Sichuan (CN); Peifeng Yu, Sichuan (CN); Zezhan Zhang, Sichuan (CN); Ying Duan, Sichuan (CN); Xueke Gou, Sichuan (CN); Guiyun Tian, Sichuan (CN)

(73) Assignee: University of Electronic Science and Technology of China, Sichuan (CN)

( * ) Notice: Subject to any disclaimer, the term of this patent is extended or adjusted under 35 U.S.C. 154(b) by 224 days.

(21) Appl. No.: 17/326,313

(22) Filed: May 20, 2021

(65) Prior Publication Data
US 2021/0270674 A1    Sep. 2, 2021

(30) Foreign Application Priority Data

May 21, 2020   (CN) .......................... 202010434918.2

(51) Int. Cl.
*G01J 5/00*     (2022.01)
*G01J 5/0806*   (2022.01)
(Continued)

(52) U.S. Cl.
CPC .............. *G01J 5/0088* (2013.01); *G01J 5/04* (2013.01); *G01J 5/0806* (2013.01); *G01J 5/10* (2013.01);
(Continued)

(58) Field of Classification Search
CPC .......... G01J 5/0088; G01J 5/04; G01J 5/0806; G01J 5/10; G01J 5/485; G01J 2005/106;
(Continued)

(56) References Cited

U.S. PATENT DOCUMENTS

| 2,314,800 | A | * | 3/1943 | Pinco | ........................ | G01J 3/42 |
| | | | | | | 250/343 |
| 4,859,832 | A | * | 8/1989 | Uehara | ................ | H05B 3/0047 |
| | | | | | | 219/405 |

(Continued)

FOREIGN PATENT DOCUMENTS

| CN | 2395290 Y | * | 9/2000 | |
| CN | 103180700 A | * | 6/2013 | ................ G01J 5/00 |

(Continued)

OTHER PUBLICATIONS

CN-103180700-A (Year: 2013)—translation.*

(Continued)

*Primary Examiner* — Mickey H France

(57) ABSTRACT

A device for measuring surface temperature of a turbine blade based on a rotatable prism includes a probe, a prism rotating apparatus and an optical focusing apparatus. The prism rotating apparatus and the optical focusing apparatus are located inside the probe. The probe includes a probe outer casing, a probe inner casing, a water-cooled casing pipe, a sapphire window piece, a quartz prism, a light pipe, a collimating lens, a focusing lens and an infrared array detector. The prism rotating apparatus includes a rotary motor, a worm, a gear and a prism rotary table, the rotary motor rotates to drive the prism rotary table to rotate. The optical focusing apparatus includes a telescopic motor, a coupler, a lead screw and a drive rod, the telescopic motor rotates to drive the lead screw, so as to further drive the drive rod to move along the slot.

3 Claims, 3 Drawing Sheets

(51) Int. Cl.
*G01J 5/10* (2006.01)
*G01M 15/02* (2006.01)
*G01M 15/14* (2006.01)
*G01J 5/04* (2006.01)
*G01J 5/48* (2022.01)

(52) U.S. Cl.
CPC ............ *G01M 15/02* (2013.01); *G01M 15/14* (2013.01); *G01J 5/485* (2022.01); *G01J 2005/106* (2013.01)

(58) Field of Classification Search
CPC .......... G01J 5/0875; G01J 5/047; G01J 5/061; G01J 5/0803; G01J 2005/0077; G01M 15/02; G01M 15/14
See application file for complete search history.

(56) References Cited

U.S. PATENT DOCUMENTS

| | | | | |
|---|---|---|---|---|
| 5,134,474 | A * | 7/1992 | Hanafusa | H04N 5/33 |
| | | | | 348/E5.081 |
| 6,330,112 | B1 * | 12/2001 | Kaise | G02F 1/133526 |
| | | | | 348/E9.027 |
| 6,640,199 | B1 * | 10/2003 | Goldstein | G01N 21/71 |
| | | | | 702/135 |
| 7,538,859 | B2 * | 5/2009 | Tearney | A61B 5/6852 |
| | | | | 356/35.5 |
| 2011/0036983 | A1 * | 2/2011 | Ford | G01S 17/74 |
| | | | | 348/E5.09 |
| 2012/0002035 | A1 * | 1/2012 | Li | G01J 5/602 |
| | | | | 348/82 |
| 2013/0229660 | A1 * | 9/2013 | Goldschmidt | G01J 3/42 |
| | | | | 356/445 |
| 2017/0045441 | A1 * | 2/2017 | Nciri | G01J 3/10 |
| 2020/0049564 | A1 * | 2/2020 | McLaren | G01J 5/026 |
| 2021/0033589 | A1 * | 2/2021 | Tufillaro | G01J 3/433 |
| 2023/0058006 | A1 * | 2/2023 | Liao | H01L 29/7786 |

FOREIGN PATENT DOCUMENTS

| | | | | |
|---|---|---|---|---|
| CN | 103261859 B | * | 7/2017 | ................ G01J 5/00 |
| JP | 2003130734 A | * | 5/2003 | |
| JP | 2011515671 A | * | 5/2011 | |
| SE | 455443 B | * | 7/1988 | ................ G01J 5/60 |

OTHER PUBLICATIONS

CN-103261859-B (Year: 2017)—translation.*
CN-2395290-Y (Year: 2000)—translation.*
JP-2003130734-A (Year: 2003)—translation.*
JP-2011515671-A (Year: 2011)—translation.*
SE-455443-B (Year: 1988)—translation.*

* cited by examiner

DEVICE FOR MEASURING SURFACE TEMPERATURE OF TURBINE BLADE BASED ON ROTATABLE PRISM

CROSS REFERENCE OF RELATED APPLICATION

The present invention claims priority under 35 U.S.C. 119(a-d) to CN 202010434918.2, filed May 21, 2020.

BACKGROUND OF THE PRESENT INVENTION

Field of Invention

The present invention relates to the field of aeroengine, and more particularly to a device for measuring a surface temperature of a turbine blade based on a rotatable prism.

Description of Related Arts

The strength and life of turbine blades determine the life of an aeroengine. Under extreme engine conditions at high speeds, the turbine blades carry the cyclic thermal load and the large centrifugal force. In order to ensure the stability and reliability of the engine during operation, it is necessary to accurately monitor the surface temperature and distribution of the turbine blades to evaluate the thermal load thereof, which is beneficial to the maintenance of the engine. Judging from the current research status, there are many institutions dedicated to the study of temperature measurement on the surface of turbine blades, but most of the researches are based on single-point temperature measurement and combined with the motion scanning of the probe and other devices, so as to achieve the surface temperature measurement of the entire turbine blade. This method is feasible, but the efficiency is slow, and it is inevitably for moving the probe position to affect the focus or stability of the optical system inside the probe. Therefore, the present invention proposes a non-single-point temperature measuring device with a rotatable prism.

SUMMARY OF THE PRESENT INVENTION

In order to solve the problems that the current temperature measuring device for turbine blades are low in efficiency and single in function, the present invention provides a device for measuring a surface temperature of a turbine blade based on a rotatable prism.

Accordingly, the present invention provides technical solutions as follows.

A device for measuring a surface temperature of a turbine blade based on a rotatable prism comprises a probe, a prism rotating apparatus and an optical focusing apparatus, wherein:

the prism rotating apparatus and the optical focusing apparatus are located at an outer wall of the probe;

the probe comprises a probe outer casing, a probe inner casing, a water-cooled casing pipe, a sapphire window piece, a quartz prism, a light pipe, a collimating lens, a focusing lens and an infrared array detector, wherein:

the probe outer casing, having a bottle-shaped structure, a cooling water inlet and a cooling water outlet, comprises a bottle body, a bottle neck and a bottle nozzle, wherein a diameter of the bottle nozzle is smaller than that of the bottle body, a diameter of the bottle neck is gradually decreased from the bottle body to the bottle nozzle, the cooling water inlet is provided at a lower portion of the bottle body, the cooling water outlet is provided at an upper portion of the bottle body;

the probe inner casing is provided within the probe outer casing, a cooling chamber is formed between the probe inner casing and the probe outer casing, the probe inner casing is tubular, a top portion of the probe inner casing is sealed with the bottle neck of the probe outer casing, a bottom portion of the probe inner casing is level with a bottom portion of the probe outer casing;

the water-cooled casing pipe, which comprises a water entry pipe and a water discharging pipe, is wound on the probe inner casing, wherein the cooling water inlet of the probe outer casing is communicated with the water entry pipe of the water-cooled casing pipe, the cooling water outlet of the probe outer casing is communicated with the water discharging pipe of the water-cooled casing pipe;

the sapphire window piece is located at a bottle mouth of the probe outer casing, the quartz prism is located within an upper portion of the probe inner casing, the light pipe is tubular and is located within a lower portion of the probe inner casing;

the collimating lens, the focusing lens and the infrared array detector are arranged within the light pipe in sequence along a light propagation direction; the quartz prism is configured to refract light passing through the sapphire window piece for allowing the light to accurately enter the light pipe;

the prism rotating apparatus comprises a rotary motor, a worm, a gear and a prism rotary table, wherein one end of the prism rotary table is located within the probe, another end of the prism rotary table is located outside the probe, a rotary through hole is provided in the probe inner casing and the probe outer casing for accommodating the prism rotary table, the one end of the prism rotary table is fixed with the quartz prism, the another end of the prism rotary table is mechanically connected with the rotary motor, so that the rotary motor rotates to drive the prism rotary table to rotate;

the optical focusing apparatus comprises a telescopic motor, a coupler, a lead screw and a drive rod, wherein the drive rod is fixed with an outer wall of the light pipe, a slot is provided in the probe inner casing and the probe outer casing for allowing the drive rod to move, the drive rod is sleeved to the lead screw, the telescopic motor is connected with the lead screw through the coupler, so that the telescopic motor rotates to drive the lead screw, so as to further drive the drive rod to move along the slot.

Further, a winding density of the water-cooled casing pipe which is wound on the probe inner casing from the lower portion of the probe inner casing to the upper portion of the probe inner casing is gradually increased.

Further, the gear is located at the another end of the prism rotary table which is located outside the probe, and the worm is cooperated with the gear.

Compared with the prior art, the present invention has some beneficial effects as follows.

The present invention provides an innovative simple double-shaft composite structure, which overcomes the installation difficulties and serious optical pollution caused by the excessive length of the traditional turbine blade measuring device extending into the engine. The spiral water cooling device is introduced based on heat transfer, which greatly increases the cooling efficiency. The rotation of the prism replaces the traditional rotation of the whole device, which not only reduces the instability of the optical system caused by the rotation of the whole device, but also improves the scanning efficiency. The simple transmission structure of the optical pipe solves the focusing problem that is not realized by the traditional probe device. The use of the array detector is able to simultaneously detect the temperature of multiple facets, which also greatly improves the scanning efficiency.

Figure 1:
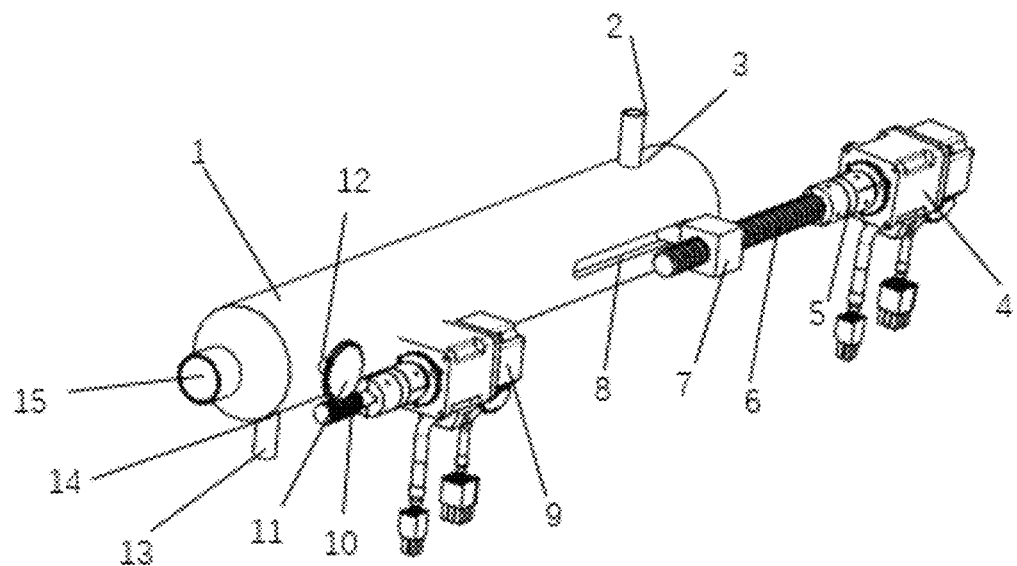
FIG. 1 is a structurally schematic view of a device for measuring a surface temperature of a turbine blade based on a rotatable prism provided by the present invention.

In the drawings, 1: probe outer casing; 2: water entry pipe; 3: cooling water inlet; 4: telescopic motor; 5: coupler; 6: lead screw; 7: drive rod; 8: slot; 9: rotary motor; 10: worm; 11: gear; 12: rotary through hole; 13: water discharging pipe; 14: cooling water outlet; 15: sapphire window piece; 16: quartz prism; 17: water-cooled casing pipe; 18: light pipe; 19: infrared array detector; 20: focusing lens; 21: collimating lens; 22: prism rotary table; 23: bottle neck; 24: probe inner casing.

DETAILED DESCRIPTION OF THE PREFERRED EMBODIMENT

The probe outer casing is a double-pass Inconel-600 pipe, which has a cooling water inlet and a cooling water outlet. A water-cooled casing pipe is an irregular spiral pipe and located within the probe outer casing. A water entry pipe of the water-cooled casing pipe passes through the cooling water inlet of the probe outer casing, and a water discharging pipe of the water-cooled casing pipe passes through the cooling water outlet of the probe outer casing, such that the cooling water is introduced through the water entry pipe while cooling, flows along a spiral direction of the water-cooled casing pipe, takes away heat from an inner wall and an outer wall of the probe outer casing, and finally flows out through the water discharging pipe, thereby achieving cooling. Moreover, the screw pitch of the water-cooled casing pipe from the water entry pipe to the water discharging pipe is gradually decreased for ensuring that cooling is sufficiently achieved when the cooling water flows towards the front end of the probe outer casing, so as to protect the entire device. A sapphire window piece is located at the top portion of the probe outer casing for allowing radiation to pass through and blocking high-temperature gas. A quartz prism is a triangular prism and located behind the sapphire window piece for refracting the radiation beam on the blade surface which penetrates through the sapphire window piece to the light pipe. The prism rotating apparatus comprises a rotary motor, a worm, a gear and a prism rotary table, wherein the gear is externally engaged with the worm, one end of the worm is engaged with the gear for transmission, another end of the worm is connected with the output shaft of the rotary motor, the gear is connected with the prism rotary table, the prism rotary table is configured to accommodate the quartz prism, the rotary motor drives the worm to rotate; when the worm rotates, the gear is driven for further driving the prism rotary table to rotate. The prism rotating apparatus is able to drive the quartz prism to rotate at any angle, so that the quartz prism is able to observe different target areas on the blade and refract the light into the light pipe. The light pipe is a stainless steel metal pipe. A collimating lens, a focusing lens and an infrared array detector are installed within the light pipe. The light pipe is located behind the quartz prism. The radiation from the surface of the blade penetrates through the quartz prism, and then passes through the collimating lens and the focusing lens in sequence both of which are located within the light pipe, and then reaches the infrared array detector, and then is converted into an electrical signal to be transmitted to an upper computer. A drive rod is welded with the light pipe for driving the light pipe to move back and forth. An optical focusing apparatus comprises a telescopic motor, a lead screw and a drive rod, wherein the telescopic motor drives the lead screw to rotate for further driving the drive rod to telescopically move along the lead screw, the drive rod drives the light pipe to telescopically move back and forth within the probe outer casing, so as to achieve focusing through telescopically adjusting an object distance of the optical system. The infrared array detector is able to divide a target surface corresponding to a detection unit into discrete units corresponding to different temperature points. Therefore, output voltage signals represent temperature values of different positions, so that when the turbine blade rotates, the temperature scanning measurement of the entire surface is completed.

The present invention is further explained in detail with embodiments and drawings as follows.

Referring to FIG. 1, the probe outer casing 1 is a double-pass Inconel-600 pipe, and the bottle nozzle of the probe outer casing 1 has an inner diameter of 26 mm for accommodating the sapphire window piece 15 with a diameter of 1 inch. The sapphire window piece allows to pass through the light at the wavelength range of 150 nm to 4500 nm and blocks high-temperature gas from the combustion environment. One end of the probe outer casing 1 has the rotary through hole 12 with a diameter of 8 mm. A slot 8 with a length of 100 mm and a width of 10 mm is provided at another end of the probe outer casing 1.

Figure 2:
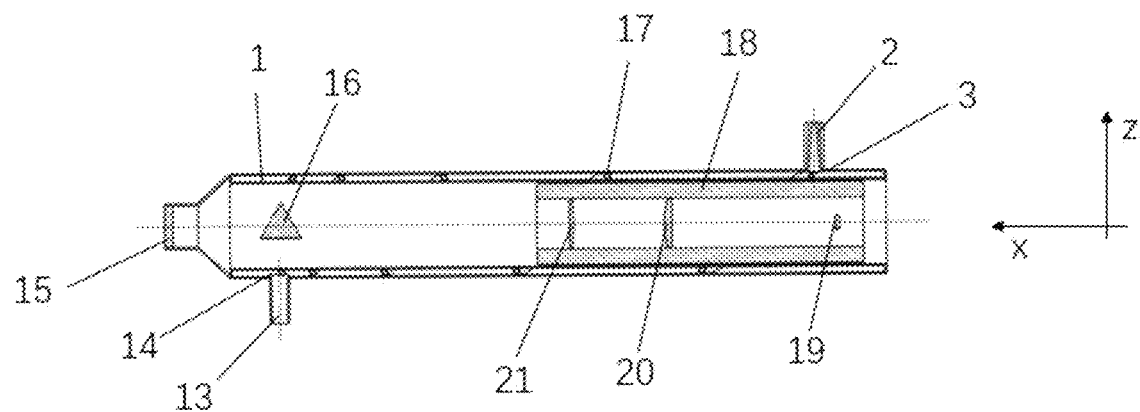
FIG. 2 is an X-O-Z sectional view of the device.
Figure 4:
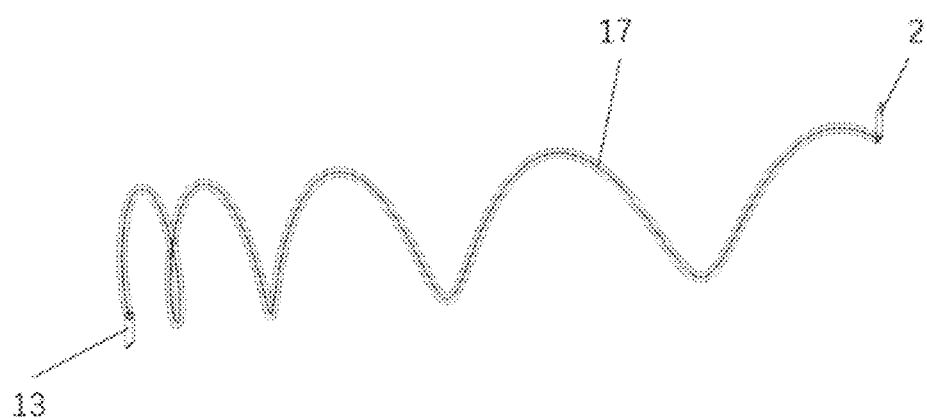
FIG. 4 is a structurally schematic view of a water-cooled casing pipe of the device.
Figure 5:
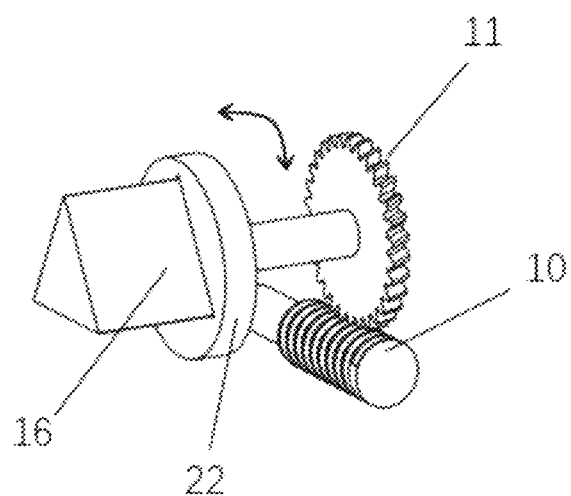
FIG. 5 is a structurally schematic view of a prism rotating apparatus of the device.

As shown in FIG. 2, the quartz prism 16 has a side length of 1 inch and is located behind the sapphire window piece 15. The light tube 18 is located behind the quartz prism 16 and has an inner diameter of 26 mm and an outer diameter of 50 mm. The collimating lens 21 with a specification of f400, the focusing lens 20 with a specification of f100 and the infrared array detector 19 with a center wavelength of 1.55 μm are arranged within the light pipe 18 in sequence along a light propagation direction. The cooling water inlet 3 and the cooling water outlet 14 are provided on the probe outer casing 1. The water-cooled casing pipe 17 is located within the probe outer casing 1. The water entry pipe 2 and the water discharging pipe 13 of the water-cooled casing pipe 17 pass through the cooling water inlet 3 and the cooling water outlet 14, respectively. Referring to FIG. 4, while cooling, the cooling water is introduced through the water entry pipe 2, flows along a spiral direction of the water-cooled casing pipe 17, takes away the heat from the inner wall and the outer wall of the probe outer casing 1, and finally flows out through the water discharging pipe 13, thereby achieving cooling. Moreover, the screw pitch of the water-cooled casing pipe 17 from the water entry pipe 2 to the water discharging pipe 13 is gradually decreased for ensuring that cooling is sufficiently achieved when the cooling water flows towards the front end of the probe outer casing 1, so as to protect the entire device.

Figure 3:
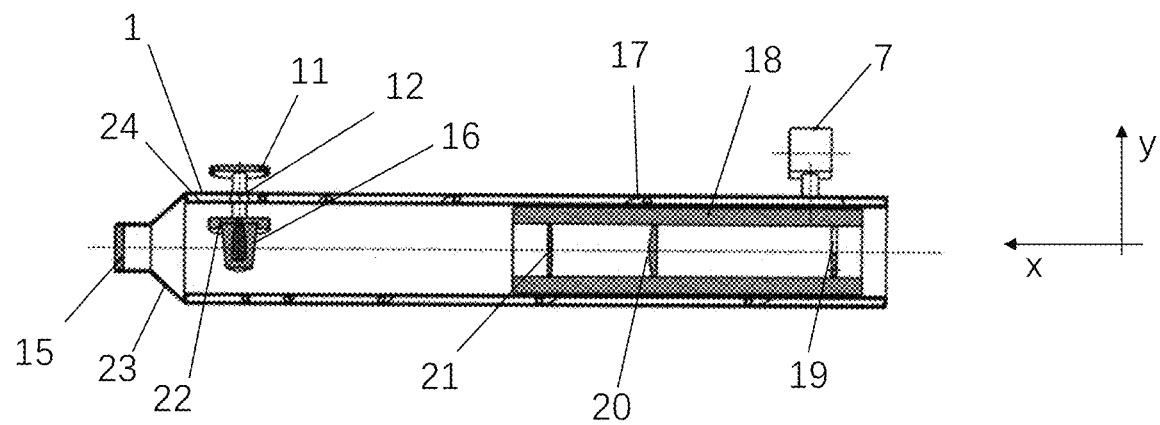
FIG. 3 is an X-O-Y sectional view of the device.

Referring to FIGS. 1, 3 and 4, the output shaft of the rotary motor 9 is connected with the worm 10, the gear 11 is externally engaged with the worm 10, the gear 11 is connected with the prism rotary table 22, the prism rotary table 22 has a groove for accommodating the triangular quartz prism 16. After the quartz prism 16 is inserted into the groove, the output shaft of the rotary motor 9 rotates to drive the worm 10 for further driving the gear 11 to rotate, so as to drive the prism rotary table 22 to rotate with the quartz prism 16. The quartz prism 16 is able to rotate at any angle by adjusting parameters of the upper computer, so as to observe different target areas on the blade and refract the light into the light pipe 18.

Referring to FIG. 3, the radiation from the surface of the blade penetrates through the quartz prism 16, and then passes through the collimating lens 21 and the focusing lens 20 in sequence both of which are located within the light pipe 18, and then reaches the infrared array detector 19, and then is converted into the electrical signal to be transmitted to the upper computer. The drive rod 7 is welded with the light pipe 18. The drive rod 7 has right-handed internal threads with a large diameter of 17, a small diameter of 15, a screw pitch of 5 mm, an angle of 50° and a length of 24 mm. As shown in FIG. 1, the lead screw 6 has external threads which cooperate with the internal threads of the drive rod 7, wherein the external threads have a length of 150 mm. An output shaft of the telescopic motor 4 is connected with the lead screw 6 through a coupler 5. When the output shaft of the telescopic motor 4 rotates, the lead screw 6 is driven for further driving the drive rod 7 to move back and forth, so as to drive the light pipe 18 to move back and forth along the inner wall of the probe outer casing 1 for adjusting an object distance of the optical system, thereby finally achieving optical focusing.

Moreover, the infrared array detector 19 is able to divide a target surface corresponding to a detection unit into discrete units corresponding to different temperature points. Therefore, output voltage signals represent temperature values of different positions, so that when the turbine blade rotates, the temperature scanning measurement of the entire surface is completed.

What is claimed is:

1. A device for measuring a surface temperature of a turbine blade based on a rotatable prism comprises a probe, a prism rotating apparatus and an optical focusing apparatus, wherein:
   the prism rotating apparatus and the optical focusing apparatus are located at an outer wall of the probe;
   the probe comprises a probe outer casing, a probe inner casing, a water-cooled casing pipe, a sapphire window piece, a quartz prism, a light pipe, a collimating lens, a focusing lens and an infrared array detector, wherein:
   the probe outer casing, having a bottle-shaped structure, a cooling water inlet and a cooling water outlet, comprises a bottle body, a bottle neck, a bottle nozzle, wherein a diameter of the bottle nozzle is smaller than that of the bottle body, a diameter of the bottle neck is gradually decreased from the bottle body to the bottle nozzle, the cooling water inlet is provided at a lower portion of the bottle body, the cooling water outlet is provided at an upper portion of the bottle body;
   the probe inner casing is provided within the probe outer casing, a cooling chamber is formed between the probe inner casing and the probe outer casing, the probe inner casing is tubular, a top portion of the probe inner casing is sealed with the bottle neck of the probe outer casing, a bottom portion of the probe inner casing is level with a bottom portion of the probe outer casing;
   the water-cooled casing pipe, which comprises a water entry pipe and a water discharging pipe, is wound on the probe inner casing, wherein the cooling water inlet of the probe outer casing is communicated with the water entry pipe of the water-cooled casing pipe, the cooling water outlet of the probe outer casing is communicated with the water discharging pipe of the water-cooled casing pipe;
   the sapphire window piece is located at a bottle mouth of the probe outer casing, the quartz prism is located within an upper portion of the probe inner casing, the light pipe is tubular and is located within a lower portion of the probe inner casing;
   the collimating lens, the focusing lens and the infrared array detector are arranged within the light pipe in sequence along a light propagation direction; the quartz prism is configured to refract light passing through the sapphire window piece for allowing the light to accurately enter the light pipe;
   the prism rotating apparatus comprises a rotary motor, a worm, a gear and a prism rotary table, wherein one end of the prism rotary table is located within the probe, another end of the prism rotary table is located outside the probe, a rotary through hole is provided in the probe inner casing and the probe outer casing for accommodating the prism rotary table, the one end of the prism rotary table is fixed with the quartz prism, the another end of the prism rotary table is mechanically connected with the rotary motor, the rotary motor drives the prism rotary table to achieve any angle rotation of the quartz prism;
   the optical focusing apparatus comprises a telescopic motor, a coupler, a lead screw and a drive rod, wherein the drive rod is fixed with an outer wall of the light pipe, a slot is provided in the probe inner casing and the probe outer casing for allowing the drive rod to move, the drive rod is sleeved to the lead screw, the telescopic motor is connected with the lead screw through the coupler, so that the telescopic motor rotates to drive the lead screw, so as to further drive the drive rod to move along the slot.

2. The device according to claim 1, wherein a winding density of the water-cooled casing pipe which is wound on the probe inner casing from the lower portion of the probe inner casing to the upper portion of the probe inner casing is gradually increased.

3. The device according to claim 1, wherein the gear is located at the another end of the prism rotary table which is located outside the probe, and the worm is cooperated with the gear to form a gear drive structure.

* * * * *